United States Patent [19]

Miyakawa et al.

[11] Patent Number: 4,899,241
[45] Date of Patent: Feb. 6, 1990

[54] METHOD OF MANUFACTURING A MAGNETIC HEAD HAVING A THIN FILM IN A PORTION OF ITS CORE

[75] Inventors: Hideaki Miyakawa; Makoto Kameyama, both of Yokohama, Japan

[73] Assignee: Canon Kabushiki Kaisha, Tokyo, Japan

[21] Appl. No.: 149,945

[22] Filed: Jan. 28, 1988

Related U.S. Application Data

[60] Division of Ser. No. 20,176, Feb. 27, 1987, abandoned, which is a continuation of Ser. No. 621,718, Jun. 18, 1984, abandoned.

[30] Foreign Application Priority Data

Jul. 5, 1983 [JP] Japan ................................ 58-121908

[51] Int. Cl.4 ................................................. G11B 5/16
[52] U.S. Cl. .................................... 360/125; 360/119; 360/126; 29/603

[58] Field of Search .................. 29/603; 360/110, 119, 360/123, 125, 126, 127

[56] References Cited

U.S. PATENT DOCUMENTS 4,246,620  1/1981  Kaminaka et al. .................. 360/127

FOREIGN PATENT DOCUMENTS 58-70418  4/1983  Japan .................................... 360/125

Primary Examiner—John H. Wolff
Attorney, Agent, or Firm—Fitzpatrick, Cella, Harper & Scinto

[57] ABSTRACT

A magnetic head comprises a first magnetic core member of a magnetic material bulk having one surface thereof as a gap forming surface, a gap member of a non-magnetic material attached to at least a portion of the gap forming surface of the first magnetic core member, and a second magnetic core member of a magnetic material thin film attached to said gap forming surface substantially perpendicularly thereto with the gap member being interleaved therebetween.

14 Claims, 6 Drawing Sheets

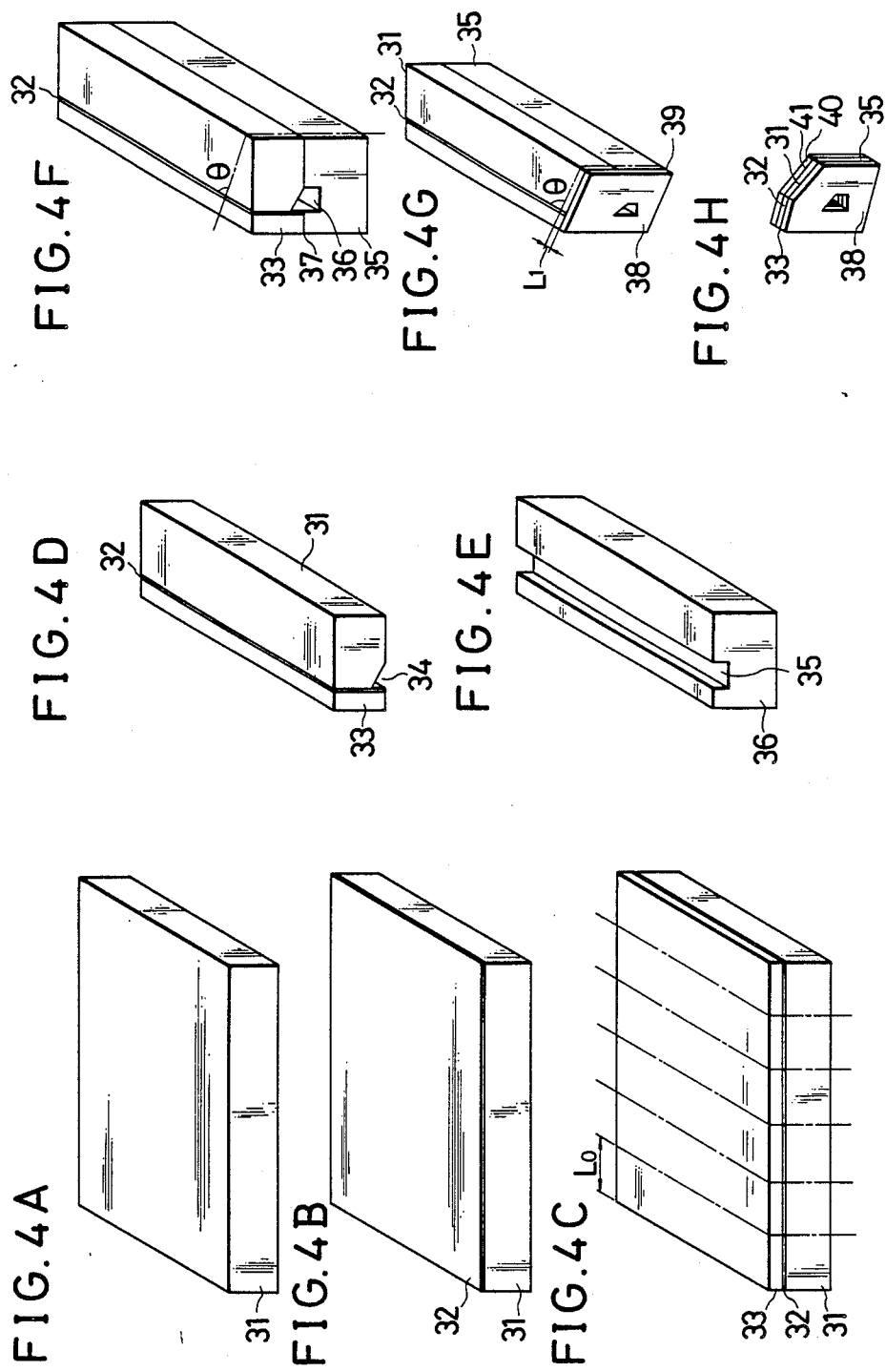

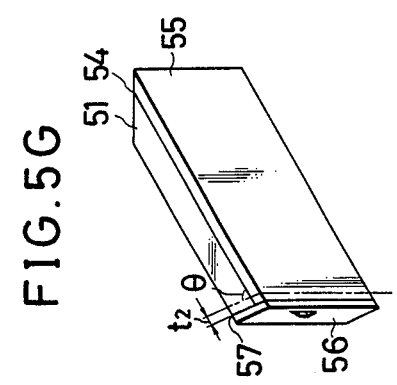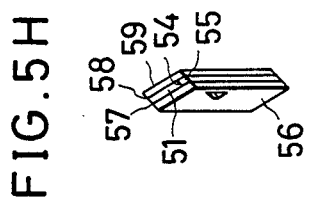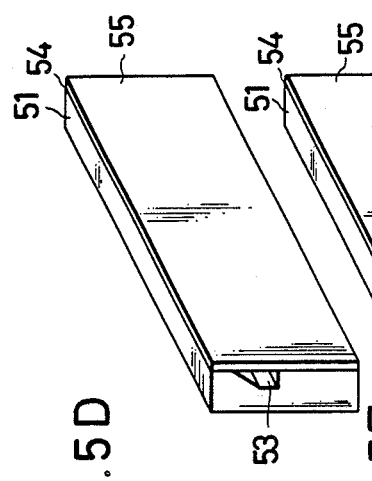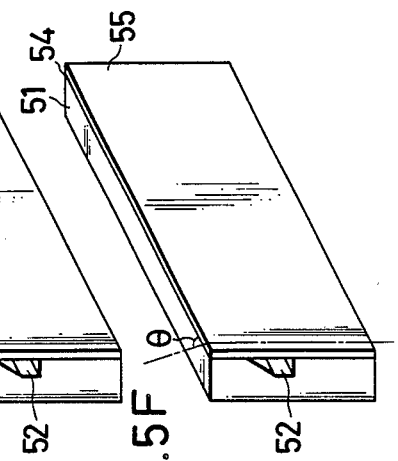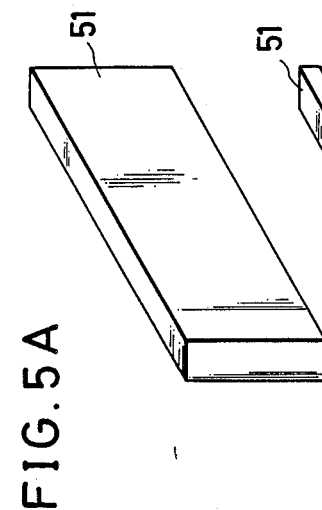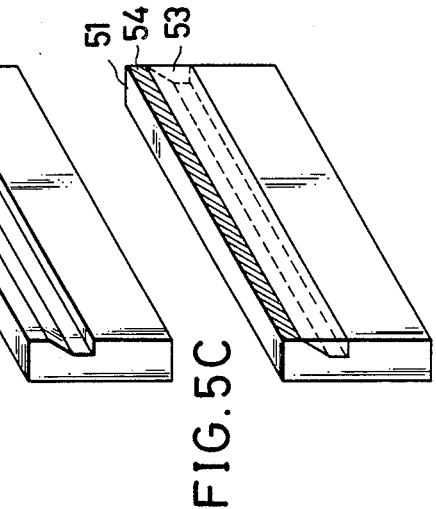

METHOD OF MANUFACTURING A MAGNETIC HEAD HAVING A THIN FILM IN A PORTION OF ITS CORE

This application is a division of application Ser. No. 020,176 filed Feb. 27, 1987, now abandoned, which is a continuation of application Ser. No. 621,718 filed June 18, 1984, now abandoned.

BACKGROUND OF THE INVENTION

1. Field of the Invention

The present invention relates to a magnetic head and a manufacturing method thereof, and more particularly to a magnetic head used to record an information signal in a narrow track being formed on a magnetic recording medium at the same time and to reproduce the information signal from the narrow track, and a manufacturing method thereof.

2. Description of the Prior Art

In the prior art, the magnetic head of this type is manufactured by a so-called butt method in which two head core members are butted with a gap member being interleaved therebetween.

FIGS. 1A–1E show an example of the manufacturing method of the magnetic head by the conventional butt method An ingot 1 of oxide magnetic material such as Mn—Zn ferrite shown in FIG. 1A is cut and ground into a magnetic material block 2 shown in FIG. 1B. A groove 3 for a winding shown in FIG. 1C is formed in the block 2 by grinding and the like, then a gap surface 4 is polished to finish it into a smooth surface. The block 2 which is one of the core members and a block 2' which is the other core member are made to face each other with a gap spacer member 5 of a non-magnetic material being on the gap surface 4, and they are fixed to each other by a bond 6 such as glass as shown in FIG. 1D. The assembly is sliced to a predetermined thickness as shown by broken lines in FIG. 1D and the slice is polished to form a magnetic head element shown in FIG. 1E. In the prior art manufacturing method of the magnetic head described above, machining work is necessary to cut and grind the gap surface 4 in order to form the required head gap. However, as a result of such machining work, the magnetic characteristic of the magnetic material is deteriorated, by the break of the magnetic material or the strain caused by the machining, and the head gap meanders or the bond at the head gap diffuses into the magnetic material so that the head gap becomes unstable. Accordingly, it is very difficult in this method to improve an electro-magnetic transducing characteristic of a magnetic head having a head gap length (referred as Gl hereinafter), Gl of smaller than 30 μm corresponding to the track width, and to mass-produce such magnetic heads.

FIGS. 2A–2I show another example of the conventional manufacturing method of the magnetic head of this type. A magnetic material plate 12 shown in FIG. 2B is placed on a reinforcing plate 11 such as a crystalized glass shown in FIG. 2A, and another reinforcing plate is placed thereon to form a three-layer lamination 13 as shown in FIG. 2C. The lamination 13 is cut along broken lines shown in FIG. 2C to form blocks 14, which are stacked one on the other as shown in FIG. 2D, and the stacked blocks 14 are cut along broken lines shown in FIG. 2D to form block halves 15. A groove 16 for a winding is formed in one of a pair of block halves as shown in FIG. 2F, and a gap spacer 18 of a non-magnetic material is attached to a gap surface 17 as shown in FIG. 2G. Then, the block half 15 and the block half 15' are butted and joined together as shown in FIG. 2H. The block is then polished and sliced to an appropriate thickness to form magnetic heads shown in FIG. 2I.

This method of manufacturing the magnetic head has the same problem in the head gap forming surface as that encountered in the method of FIG. 1. In addition, it is difficult to align the tracks (align the magnetic material member of the block half 15' to the magnetic material member of the block half 15).

FIG. 3A–3D show another example of the conventional manufacturing method of the magnetic head which was proposed to resolve the above problem. A hole 22 is previously formed in a head substrate 21 as shown in FIG. 3A, a magnetic material core member 23 such as Sendust alloy is deposited on the substrate 21, and a gap member 24 of a non-magnetic material such as $SiO_2$ having a predetermined thickness is deposited on one surface of the magnetic material core member 23, that is, a gap forming surface, as shown in FIG. 3B. A magnetic material thin film 25 such as Sendust is deposited on another magnetic material core member by sputtering as shown by an arrow a in FIG. 3B, and the magnetic material thin films 25 deposited to undesired areas are removed to form a head block shown in FIG. 3C.

In this manufacturing method, the problem encountered in the butt method is resolved but the following new problem arises. In this method, it is H) necessary to form the aperture 22 (FIG. 3A) for the winding in the magnetic head substrate 21. However, when the magnetic head having a small Gl such as smaller than 20 μm is to be manufactured, the shape of the small aperture significantly affects a recording/reproducing efficiency of the magnetic head. Accordingly, it is required to very precisely form the aperture having $\theta=60°$, $l_1=0.4$ mm and $l_2=0.35$ mm as shown in FIG. 3A. The magnetic head substrate 21 must be made of a substrate material such as partially crystallized glass which has the equal thermal expansion coefficient to that of the magnetic material thin films 23 and 25 deposited by sputtering, shows a good compliance to a magnetic recording material such as a magnetic tape and has a high abrasion resistance. It is almost impossible to precisely form the aperture of FIG. 3A in the substrate 21 of such material. It may be possible to drill a round hole by an ultrasonic machine and shaping the hole by a grinding stone, but this is far from practical.

FIG. 3 shows a sectional view after the magnetic material thin film has been deposited to the intermediate member shown in FIG. 3B. As shown in FIG. 3D, the magnetic material thin film 25 deposited by sputtering causes a step coverage, that is, an insufficiently deposited area as shown by an arrow b.

SUMMARY OF THE INVENTION

It is an object of the present invention to provide a magnetic head free of the problem described above.

It is another object of the present invention to provide a magnetic head having a short head gap length or a narrow track width with a stable head gap characteristic.

It is another object of the present invention to provide a magnetic head in which an aperture for a winding can be readily formed.

In order to achieve the above objects, in accordance with one aspect of the present invention, there is provided a magnetic head comprising:

(a) a first magnetic core member formed from a magnetic material block having one surface thereof as a gap forming surface;

(b) a gap member of a non-magnetic material attached to at least a portion of said gap forming surface of said first magnetic core member; and (c) a second magnetic core member attached to said gap forming surface substantially perpendicularly thereto with said gap member being interleaved therebetween.

It is another object of the present invention to improve the characteristic of a head assembly having a pair of narrow track heads closely arranged and to reduce a size thereof.

In order to achieve the above object, in accordance with one aspect of the present invention, there is provided a magnetic head assembly comprising:

(a) a first head including;
a first magnetic core member formed from a magnetic material block;
a second magnetic core member of a magnetic material thin film; and
a first magnetic gap member of a non-magnetic material interleaved between said first magnetic core member and said second magnetic core member; and (b) a second head including:
a third magnetic core member formed from a magnetic material block;
a fourth magnetic core member of a magnetic material thin film arranged to face said second magnetic core member; and
a second magnetic gap member of a non-magnetic material interleaved between said third magnetic core member and said fourth magnetic core member and arranged closely to said first magnetic gap member.

It is another object of the present invention to provide a manufacturing method of the magnetic head which is suitable to achieve the above objects.

Other objects and advantages of the present invention will be apparent from the following description of the preferred embodiment of the present invention.

BRIEF DESCRIPTION OF THE DRAWINGS

FIGS. 4A–4H show one embodiment of a manufacturing method of a magnetic head in accordance with the present invention, FIGS. 5A–5H show another embodiment of the manufacturing method of the magnetic head in accordance with present invention.

DETAILED DESCRIPTION OF THE PREFERRED EMBODIMENTS

Figure 1A:
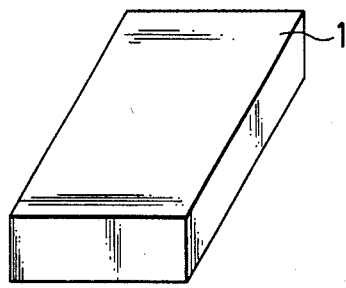
FIGS. 1A–1E show an example of a manufacturing method of a magnetic head by a conventional butt method.
Figure 1B:
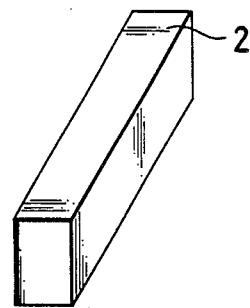
Figure 1C:
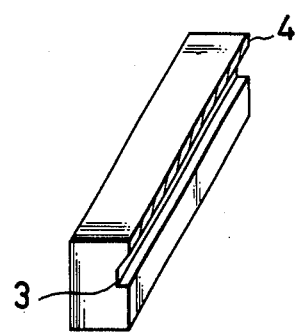
Figure 1D:
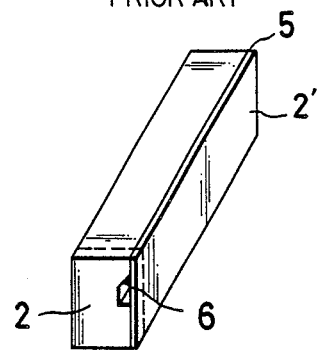
Figure 1E:
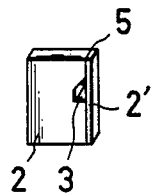
Figure 2A:
FIGS. 2A–2I show another example of the conventional manufacturing method of the magnetic head.
Figure 2B:
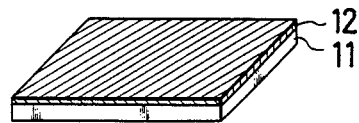
Figure 2C:
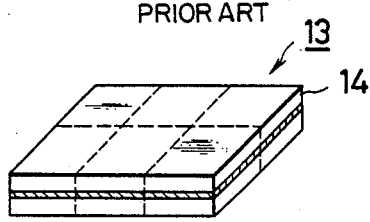
Figure 2D:
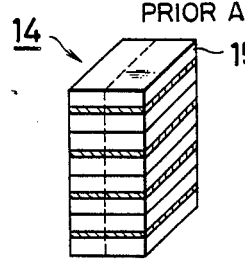
Figure 2E:
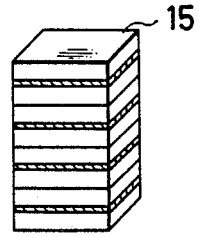
Figure 2F:
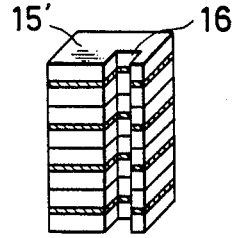
Figure 2G:
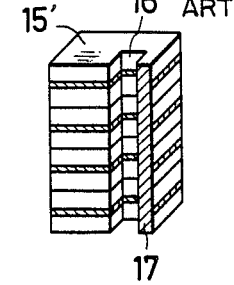
Figure 2H:
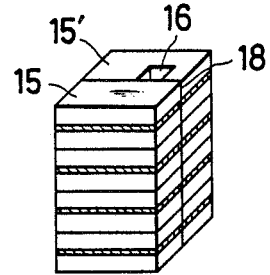
Figure 2I:
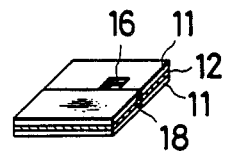
Figure 3A:
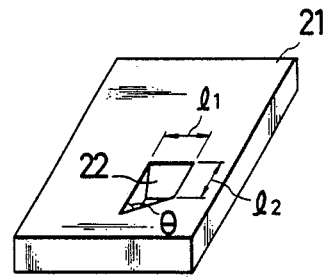
FIGS. 3A–3D show a further example of the conventional manufacturing method of the magnetic head.
Figure 3B:
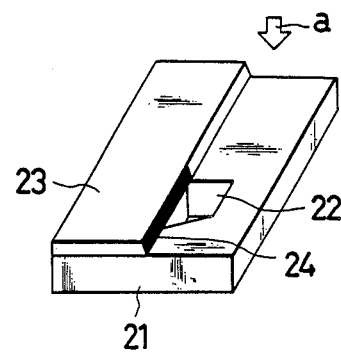
Figure 3C:
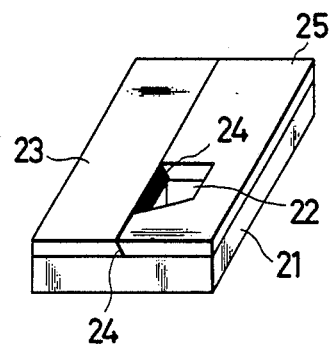
Figure 3D:
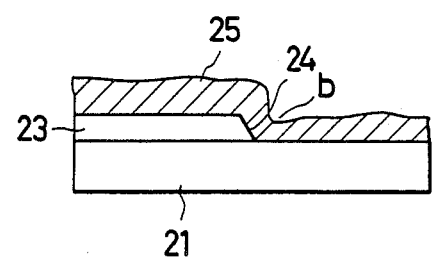

A magnetic head and a manufacturing method thereof of the present invention are now explained with reference to specific embodiments.

FIGS. 4A–4H show one embodiment of the manufacturing method of the magnetic head in accordance with the present invention. In FIG. 4A, numeral 31 denotes a magnetic material block such as Sendust which forms a first magnetic core member, and a magnetic gap member 32 of non-magnetic material such as $SiO_2$ is sputtered to a surface formed on the magnetic material block 31 to a predetermined thickness as shown in FIG. 4B. Then, a magnetic material thin film 33 such as Sendust which forms a second magnetic core member is deposited on the gap member 32 by sputtering as shown in FIG. 4C. The laminated block is cut to a length $L_0(=Gd+\Delta l)$, where Gd is a gap depth of the magnetic head and $\Delta l$ is a cutting width, along chain lines shown in FIG. 4C. Then, a groove 34 which forms a portion of a winding window as shown in FIG. 4D is formed each of magnetic material blocks cut out from the laminated block 31.

Numeral 35 in FIG. 4E denotes a back core block of an oxide magnetic material such as Mn—Zn ferrite. It also has a groove 36 which forms a portion of the winding window. The back core block 35 and the laminated block 31 of FIG. 4D are bonded together by a bond 37 as shown in FIG. 4F. After bonding, the bonded block is cut along the chain lines shown in FIG. 4F, and a reinforcing plate 38 such as crystallized glass is bonded to a cut surface by a bond 39 as shown in FIG. 4G. Then, the bonded block is cut along the chain lines shown in FIG. 4G, $L_1$ equal to the sum of a track width t and a grinding width $\Delta t$. A similar reinforcing plate 40 is bonded to the cut surface by a bond 41 to finish it so that a magnetic head shown in FIG. 4H is formed. The cut angle $\theta$ in FIGS. 4A and 4G is 90 degrees when a direction of relative movement of the head and the recording medium and a direction of magnetization in recording are to be matched, and slightly shifted from 90 degrees when an azimuth angle is desired.

The head gap surface of the magnetic head manufactured by the above manufacturing method is very stable and no track width adjustment is required. As opposed to the manufacturing method shown in FIG. 3, the material of the substrates 38 and 40 is not critical and the winding aperture can be readily formed.

FIGS. 5A–5H show another embodiment of the manufacturing method of the magnetic head in accordance with the present invention. A winding window 52 shown in FIG. 5B is formed by cutting and grinding in a magnetic material block 51 such as Sendust which forms a first magnetic core member shown in FIG. 5A. The winding window 52 is then filled with a cover material 53 such as aluminum or silver solder as shown in FIG. 5C. A non-magnetic material 54 such as $SiO_2$ is deposited to a gap surface of the block 51 to a predetermined thickness to form a magnetic gap. As shown in FIG. 5D, magnetic thin film 55 such as Sendust is deposited by sputtering to form a second magnetic core member which sandwiches the gap member 54 with the block 51. As shown in FIG. 5E, the cover member 53 is dissolved and removed to form the winding window 52, and the block is cut along chain lines shown in FIG. 5F taking the azimuth angle into consideration.

As shown in FIG. 5G, a reinforcing plate 56 is bonded to the cut surface by a bond 57, and the block is sliced along chain lines shown in FIG. 5G. In FIG. 5G, $L_2$ is equal to a sum of the track width and a cutting width, like the $L_1$. A reinforcing plate 59 is bonded to the cut surface by a bond 58 as shown in FIG. 5H. The cover material 53 filled in the winding window 52 may be dissolved and removed after the formation of the head element shown in FIG. 5H.

The magnetic head manufactured by the manufacturing method of FIGS. 5A–5H also has the same characteristic as that manufactured by the manufacturing method of FIGS. 4A–4H has.

Figure 6:
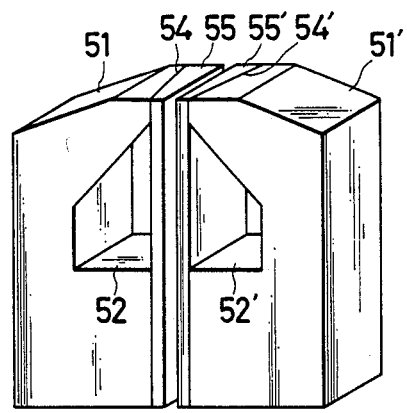
FIG. 6 shows a head assembly constructed by the magnetic heads of the present invention.

FIG. 6 shows an assembly constructed by the magnetic heads of the present invention. It uses two magnetic heads manufactured by the manufacturing method of FIG. 5 and the heads are ground and arranged to have two head gaps in a direction of relative movement of the head and the recording medium. The direction of magnetization of the respective heads are shifted in the opposite directions to the direction of relative movement. That is, they have different azimuth angles. Such a head assembly is used as a double azimuth head for a special reproducing purpose in a rotary head VTR, as is well known. In the double azimuth head, the distance between two head gaps must usually be equal to a record length of (n½) horizontal scan period of a video signal, where n is a positive integer and preferably as small as possible. Thus, the distance between the two head gaps must be small and precise. By employing the heads of the present invention to this head assembly, the cores 55 and 55′ shown in FIG. 6 can be very thin and the thickness of the cores 55 and 55′ can be controlled by controlling the sputtering time. Therefore, the distance can be readily set.

As described hereinabove, in accordance with the present invention, the head gap is formed without butting and machining the head gap surfaces. Accordingly, misalignment of the track and instability of the head gap surface are avoided, and the step coverage which was encountered in the prior art manufacturing method is also avoided.

What we claim is:

1. A method for manufacturing a magnetic head which forms a track of a predetermined track width on a magnetic recording medium, comprising the steps of:
    depositing a thin film of a non-magnetic material on at least a portion of a first surface of a magnetic member;
    depositing a magnetic thin film on said non-magnetic thin film to form a laminated block, the direction of growth of said magnetic film being substantially perpendicular to said first surface;
    cutting said laminated block in a plurality of planes parallel with each other to form a plurality of magnetic head core blocks, wherein the planes cross through said magnetic member, said non-magnetic thin film and said magnetic thin film, and an interval of two adjacent planes of said plurality of planes corresponding to the predetermined track width; and
    bonding two reinforcing members of a non-magnetic material on two opposing surfaces of at least one of said magnetic head core blocks provided by said two adjacent planes of said cutting step.

2. A method for manufacturing a magnetic head according to claim 1, wherein said magnetic thin film is made of a magnetic alloy.

3. A method for manufacturing a magnetic head according to claim 2, wherein at least a portion of said magnetic member is made of said magnetic alloy.

4. A method for manufacturing a magnetic head according to claim 3, wherein said magnetic alloy is Sendust alloy.

5. A method for manufacturing a magnetic head according to claim 3, wherein that portion of said magnetic member where said magnetic thin film is deposited is made of said magnetic alloy.

6. A method for manufacturing a magnetic head according to claim 5, further comprising combining an oxide magnetic block with said laminated block prior to cutting said laminated block.

7. A method for manufacturing a magnetic head according to claim 6, wherein said oxide magnetic block is made of a ferrite.

8. A method for manufacturing a magnetic head which forms a track of a predetermined track width on a magnetic recording medium, comprising the steps of:
    depositing a thin film of a non-magnetic material on at least a portion of a first surface of a first magnetic material block;
    depositing a magnetic thin film on said non-magnetic thin film to form a laminated block, the direction of growth of said magnetic film being substantially perpendicular to said first surface;
    bonding a second magnetic material block with said first laminated block to form a laminated member such that said second magnetic material block is disposed in a direction perpendicular to said first surface of said first magnetic material block; and
    cutting said laminated block in a plurality of planes parallel with each other to form a plurality of magnetic head core blocks, wherein said plurality of planes cross through said magnetic material block, said non-magnetic thin film and said magnetic thin film, and an interval of two adjacent planes of said plurality of planes corresponding to the predetermined track width.

9. A method of manufacturing a magnetic head according to claim 8, wherein said first magnetic material block and said magnetic material thin film are made of Sendust alloy and said magnetic material block is made of a ferrite.

10. A method of manufacturing a magnetic head according to claim 8, further comprising prior to said combining step, forming a groove for accommodating a coil winding in a portion of said second magnetic material block facing said first laminated block.

11. A method of manufacturing a magnetic head according to claim 8, further comprising a fifth step, prior to said combining step, of forming a groove for accommodating a coil winding in a portion of said first laminated block facing said groove of said second magnetic material block.

12. A method for manufacturing a magnetic head which forms a track of a predetermined track width on a magnetic recording medium, comprising the steps of:
    forming a groove in a first surface of a magnetic member;
    filling a cover material different from a material of said magnetic member into said groove;
    depositing a thin film of a non-magnetic material to at least a portion of a first surface;
    depositing a magnetic thin film on said non-magnetic thin film to form a laminated block, the direction of growth of said magnetic film being substantially perpendicular to said first surface;

cutting said laminated block in a plurality of planes parallel with each other to form a plurality of magnetic head core blocks, wherein said plurality of planes crossing through the magnetic member, the non-magnetic thin film and the magnetic thin film, and an interval of two adjacent planes of said plurality of planes corresponding to the predetermined track width;

removing said cover member either prior to or after said cutting step; and bonding two reinforcing members of non-magnetic material on two opposing surfaces of at least one of said plurality of said magnetic head core blocks provided by said two adjacent planes of said cutting step.

13. A method for manufacturing a magnetic head according to claim 12, wherein said magnetic thin film is made of a magnetic alloy.

14. A method for manufacturing a magnetic head according to claim 13, wherein at least a portion of said magnetic member is made of said magnetic alloy.

* * * * *

UNITED STATES PATENT AND TRADEMARK OFFICE
CERTIFICATE OF CORRECTION

PATENT NO. : 4,899,241

DATED : February 6, 1990

INVENTOR(S) : Hideaki Miyakawa, et al.

It is certified that error appears in the above-identified patent and that said Letters Patent is hereby corrected as shown below:

ON THE TITLE PAGE

IN THE U.S. PATENT DOCUMENTS

Add the following:

| | | | |
|---|---|---|---|
| 4,127,884 | 11/1978 | Nouchi, et al. | 360/119 |
| 4,222,117 | 12/1983 | Nomura, et al. | 360/126 |
| 4,475,137 | 10/1984 | Yasuda, et al. | 360/126 |
| 4,589,042 | 5/1986 | Anderson, et al. | 360/125 |

FOREIGN PATENT DOCUMENTS

Add the following:

| | | | |
|---|---|---|---|
| 46-36068 | 10/1971 | Japan | 29/603 |
| 853,661 | 8/1981 | U.S.R.R. | 29/603 |
| 56-114114 | 9/1981 | Japan | 360/125 |
| 57-50315 | 3/1982 | Japan | 360/121 |
| 58-56219 | 4/1983 | Japan | 29/603 |
| 58-179919 | 10/1983 | Japan | 360/125 |

COLUMN 1

Line 27, "method An" should read --method. An--.

UNITED STATES PATENT AND TRADEMARK OFFICE
CERTIFICATE OF CORRECTION

PATENT NO. : 4,899,241

DATED : February 6, 1990

INVENTOR(S) : Hideaki Miyakawa, et al.

It is certified that error appears in the above-identified patent and that said Letters Patent is hereby corrected as shown below:

COLUMN 2

Line 12, "FIG. 3A-3D" should read --FIGS. 3A-3D--;
    Line 31, "H)" should be deleted;
    Line 51, "FIG. 3" should read --FIG. 3D--; and
    Line 61, "problem" should read --problems--.

COLUMN 3

Line 18, "a" should read --the--; and
    Line 50, "embodiment" should read --embodiments--.

COLUMN 4

Line 22, "formed each" should read --formed in each--.

COLUMN 5

Line 13, "FIGS. 4A-4H has." should read --FIGS. 4A-4H.--.

UNITED STATES PATENT AND TRADEMARK OFFICE
CERTIFICATE OF CORRECTION

PATENT NO. : 4,899,241

DATED : February 6, 1990

INVENTOR(S) : Hideaki Miyakawa, et al.

It is certified that error appears in the above-identified patent and that said Letters Patent is hereby corrected as shown below:

COLUMN 6

Line 24, "magnetic thin film" should read --magnetic material thin film--;

Line 26, "magnetic film" should read --magnetic thin film--;

Line 33, "laminated block" should read --laminated member--; and

Line 66, "a first surface;" should read --said first surface;--.

COLUMN 7

Line 1, "magnetic film" should read --magnetic thin film--; and

Line 6, "crossing" should read --cross--.

COLUMN 8

Line 3, "said" (second occurrence) should be deleted.

Signed and Sealed this

Eighth Day of September, 1992

*Attest:*

DOUGLAS B. COMER

*Attesting Officer*     *Acting Commissioner of Patents and Trademarks*